(12) United States Patent
Jose et al.

(10) Patent No.: US 10,925,093 B2
(45) Date of Patent: Feb. 16, 2021

(54) METHOD AND APPARATUS FOR DETECTING CONSISTENT LISTEN BEFORE TALK FAILURE IN MOBILE COMMUNICATIONS

(71) Applicant: MediaTek Singapore Pte. Ltd., Singapore (SG)

(72) Inventors: Pradeep Jose, Cambridge (GB); Mehmet Kunt, Cambridge (GB)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

(21) Appl. No.: 16/681,760

(22) Filed: Nov. 12, 2019

(65) Prior Publication Data

US 2020/0154480 A1    May 14, 2020

Related U.S. Application Data

(60) Provisional application No. 62/760,091, filed on Nov. 13, 2018, provisional application No. 62/911,408, filed on Oct. 7, 2019.

(51) Int. Cl.
| | | |
|---|---|---|
| *H04W 72/00* | (2009.01) | |
| *H04W 74/08* | (2009.01) | |
| *H04W 76/19* | (2018.01) | |
| *H04W 72/02* | (2009.01) | |
| *H04W 16/14* | (2009.01) | |

(52) U.S. Cl.
CPC ....... *H04W 74/0825* (2013.01); *H04W 72/02* (2013.01); *H04W 76/19* (2018.02); *H04W 16/14* (2013.01)

(58) Field of Classification Search
USPC .................................. 370/328, 329; 455/454
See application file for complete search history.

(56) References Cited

U.S. PATENT DOCUMENTS

2017/0099667 A1*  4/2017  Dinan ................... H04L 5/0053
2017/0231005 A1*  8/2017  Babaei ................... H04L 5/001
(Continued)

FOREIGN PATENT DOCUMENTS

| CN | 107770868 A | 3/2018 |
| CN | 107770878 A | 3/2018 |
| WO | WO 2017186174 A1 | 11/2017 |

OTHER PUBLICATIONS

China National Intellectual Property Administration, International Search Report and Written Opinion for PCT/CN2019/117960, dated Feb. 17, 2020.

(Continued)

*Primary Examiner* — David Q Nguyen
(74) *Attorney, Agent, or Firm* — Han IP PLLC; Andy M. Han

(57) ABSTRACT

Various solutions for detecting consistent listen before talk (LBT) failure with respect to user equipment and network apparatus in mobile communications are described. An apparatus may determine whether an LBT failure is detected. The apparatus may start a first timer in an event that the LBT failure is detected. The apparatus may increase an LBT counter. The apparatus may determine whether the LBT counter reaches a threshold value. The apparatus may determine a consistent LBT failure event in an event that the LBT counter reaches the threshold value.

14 Claims, 15 Drawing Sheets

(56) References Cited

U.S. PATENT DOCUMENTS

| | | | |
|---|---|---|---|
| 2017/0231011 A1* | 8/2017 | Park | H04W 74/006 |
| 2017/0332358 A1* | 11/2017 | Park | H04W 72/042 |
| 2018/0176961 A1* | 6/2018 | Babaei | H04W 74/0833 |
| 2018/0242357 A1* | 8/2018 | Khirallah | H04L 1/1812 |
| 2018/0324867 A1 | 11/2018 | Basu Mallick et al. | |
| 2019/0082436 A1* | 3/2019 | Huang | H04W 16/32 |
| 2019/0159251 A1* | 5/2019 | Li | H04L 1/1812 |
| 2019/0253200 A1* | 8/2019 | Salem | H04W 72/042 |
| 2019/0349969 A1* | 11/2019 | Chakraborty | H04W 72/1273 |
| 2020/0077446 A1* | 3/2020 | Agiwal | H04W 16/14 |
| 2020/0146063 A1* | 5/2020 | Xu | H04W 24/08 |
| 2020/0154475 A1* | 5/2020 | Pao | H04W 80/08 |
| 2020/0260452 A1* | 8/2020 | Dinan | H04W 72/0446 |

OTHER PUBLICATIONS

Taiwan Intellectual Property Office, Office Action for Taiwan Patent Application No. 108141152, dated Oct. 23, 2020.

* cited by examiner

METHOD AND APPARATUS FOR DETECTING CONSISTENT LISTEN BEFORE TALK FAILURE IN MOBILE COMMUNICATIONS

CROSS REFERENCE TO RELATED PATENT APPLICATION(S)

The present disclosure claims the priority benefit of U.S. Provisional Patent Application No. 62/760,091, filed 13 Nov. 2018, and U.S. Provisional Patent Application No. 62/911,408, filed 7 Oct. 2019. The contents of aforementioned applications are herein incorporated by reference in their entirety.

TECHNICAL FIELD

The present disclosure is generally related to mobile communications and, more particularly, to detecting consistent listen before talk failure with respect to user equipment and network apparatus in mobile communications.

BACKGROUND

Unless otherwise indicated herein, approaches described in this section are not prior art to the claims listed below and are not admitted as prior art by inclusion in this section.

In New Radio (NR), a study item on NR based access to unlicensed spectrum (NR-U) has been triggered. The use of unlicensed spectrum is governed by various requirements. One such requirement is a Listen Before Talk (LBT) mechanism to ensure that a channel is free before it can be used by a device. NR-U applies an LBT mechanism for channel access to unlicensed spectrum. Unlike the study in Long-Term Evolution (LTE) Licensed Assisted Access (LAA), where the unlicensed link is controlled via a licensed link, the study in NR is expected to also cover the standalone case, i.e. no licensed link is available.

LBT is performed by a device by sensing the channel for a period of time. The device monitors the channel for a time period to check if it is free. If the energy detected in the channel is higher than a predetermined threshold, the channel is deemed to be busy and the device cannot use the channel for a transmission, i.e. LBT has failed. If the energy detected in the channel is lower than a predetermined threshold for a period of time, the channel is deemed to be free and can be used by the device for its transmission, i.e. LBT is successful. In case of an LBT failure, the device may continue monitoring the channel for a period of time to determine when the channel is free to be accessed.

In case several devices are operating on the same unlicensed channel, the chances of LBT failure is higher due to higher channel occupancy of the channel by the devices operating on the same channel. For standalone NR, operation in a busy unlicensed channel reduces the probability of the network and the UE being able to communicate with each other. As all control information is transmitted over the unlicensed channel in standalone NR-U, it is important that the UE is reachable to the network. If a channel is deemed to be inordinately busy, preventing the UE and the network to communicate with each other, the UE and the network could have no chance to establish a successful link for transmissions.

Accordingly, how to avoid unreachable status between the UE and the network node due to busy channels becomes an important issue for unlicensed band access in the newly developed wireless communication network. Therefore, it is needed to provide proper mechanisms to detect consistent LBT failures and proper recovery procedures to establish a link successfully.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to detecting consistent LBT failure with respect to user equipment and network apparatus in mobile communications.

In one aspect, a method may involve an apparatus determining whether an LBT failure is detected. The method may also involve the apparatus starting a first timer in an event that the LBT failure is detected. The method may further involve the apparatus increasing an LBT counter. The method may further involve the apparatus determining whether the LBT counter reaches a threshold value. The method may further involve the apparatus determining a consistent LBT failure event in an event that the LBT counter reaches the threshold value.

In one aspect, a method may involve an apparatus determining whether an uplink transmission is triggered. The method may also involve the apparatus starting a timer in an event that the uplink transmission is triggered. The method may further involve the apparatus determining whether the timer is expired. The method may further involve the apparatus determining a consistent LBT failure event in an event that the timer is expired.

In one aspect, a method may involve an apparatus maintaining a sliding window. The method may also involve the apparatus initiating an LBT counter. The method may further involve the apparatus increasing the LBT counter in an event that an LBT failure is detected within the sliding window. The method may further involve the apparatus determining whether the LBT counter reaches a threshold value. The method may further involve the apparatus determining a consistent LBT failure event in an event that the LBT counter reaches the threshold value.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT), Narrow Band Internet of Things (NB-IoT) and Industrial Internet of Things (IIoT), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Figure 1:
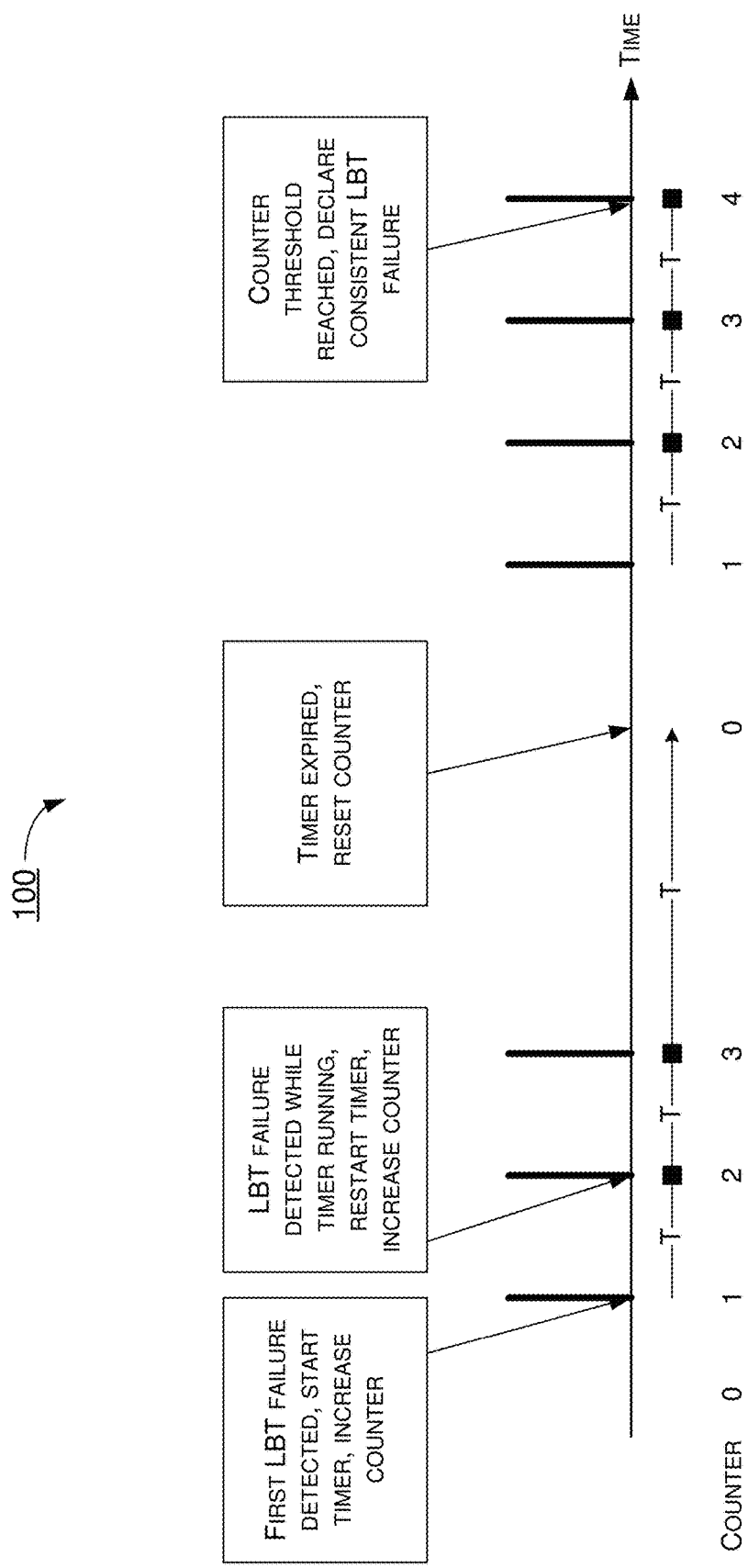
FIG. 1 is a diagram depicting an example scenario under schemes in accordance with implementations of the present disclosure.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to detecting consistent LBT failure with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

In NR, a study item on NR based access to unlicensed spectrum (NR-U) has been triggered. The use of unlicensed spectrum is governed by various requirements. One such requirement is an LBT mechanism to ensure that a channel is free before it can be used by a device. NR-U applies an LBT mechanism for channel access to unlicensed spectrum. Unlike the study in LTE LAA, where the unlicensed link is controlled via a licensed link, the study in NR is expected to also cover the standalone case, i.e. no licensed link is available.

LBT is performed by a device by sensing the channel for a period of time. The device monitors the channel for a time period to check if it is free. If the energy detected in the channel is higher than a predetermined threshold, the channel is deemed to be busy and the device cannot use the channel for a transmission, i.e. LBT has failed. If the energy detected in the channel is lower than a predetermined threshold for a period of time, the channel is deemed to be free and can be used by the device for its transmission, i.e. LBT is successful. In case of an LBT failure, the device may continue monitoring the channel for a period of time to determine when the channel is free to be accessed.

In case several devices are operating on the same unlicensed channel, the chances of LBT failure is higher due to higher channel occupancy of the channel by the devices operating on the same channel. For standalone NR, operation in a busy unlicensed channel reduces the probability of the network and the UE being able to communicate with each other. As all control information is transmitted over the unlicensed channel in standalone NR-U, it is important that the UE is reachable to the network. If a channel is deemed to be inordinately busy, preventing the UE and the network to communicate with each other, the UE and the network should strive to move to a different communication channel.

In view of the above, the present disclosure proposes a number of schemes pertaining to detecting consistent/systematic LBT failure with respect to the UE and the network apparatus. As a first step to recover the link between the UE and the network in the case of high channel occupancy, the UE should be able to detect that there is a problem with the current link. One metric that can be used to determine that a channel is busy is a high occurrence of LBT failures. According to the schemes of the present disclosure, some mechanisms are proposed for the UE to detect the occurrence of consistent/systematic LBT failure. The consistent/systematic LBT failure could be detected before performing an uplink transmission. Accordingly, the UE is able to perform some recovery actions to establish a link with the network successfully. The interruption or an unreachable state due to a busy channel between the UE and the network apparatus can be avoided.

FIG. 1 illustrates an example scenario 100 under schemes in accordance with implementations of the present disclosure. Scenario 100 involves a UE and a network node, which may be a part of a wireless communication network (e.g., an LTE network, an LTE-Advanced network, an LTE-Advanced Pro network, a 5G network, an NR network, an IoT network, an NB-IoT network or an IIoT network). To communicate or establish a link with the network node, the UE may be configured to transmit an uplink signal to the network node. The uplink signal may comprise, for example and without limitation, at least one of a random access channel (RACH) preamble, a scheduling request (SR), a buffer status report (BSR), a sounding reference signal (SRS), an uplink data, and uplink control information such as channel stat information (CSI) or hybrid automatic repeat request (HARQ) feedback. Before transmitting the uplink signal, the UE may need to perform an LBT detection to check if a channel is free for use. Specifically, the UE may be configured to sense energy of a channel for a period of time. The UE may be configured to determine whether an LBT failure is detected. In an event that the LBT failure is detected, the UE may be configured to start a timer (e.g., an LBT failure detection timer). The UE may further be configured to increase an LBT counter by 1. The initial value of the LBT counter may be set as 0.

The UE may be configured to keep monitoring the channel. In an event that the timer is expired, it means that the LBT failure has not occurred for a period of time. The UE may be configured to reset the LBT counter (e.g., set the LBT counter to 0). In an event that an LBT failure is detected while the timer is running, the UE may be configured to restart the timer and increase the LBT counter by 1. In addition, the UE may be configured to determine whether the LBT counter reaches a threshold value (e.g., greater than or equal to the threshold value). The threshold value may be a maximum count of LBT failures (e.g., LBT failure instance max count) used for determining a consistent LBT failure. The threshold value may be a predetermined value or configured by the network node (e.g., threshold value=4). In an event that the LBT counter reaches the threshold value, the UE may be configured to declare/determine a consistent LBT failure event.

Figure 2:
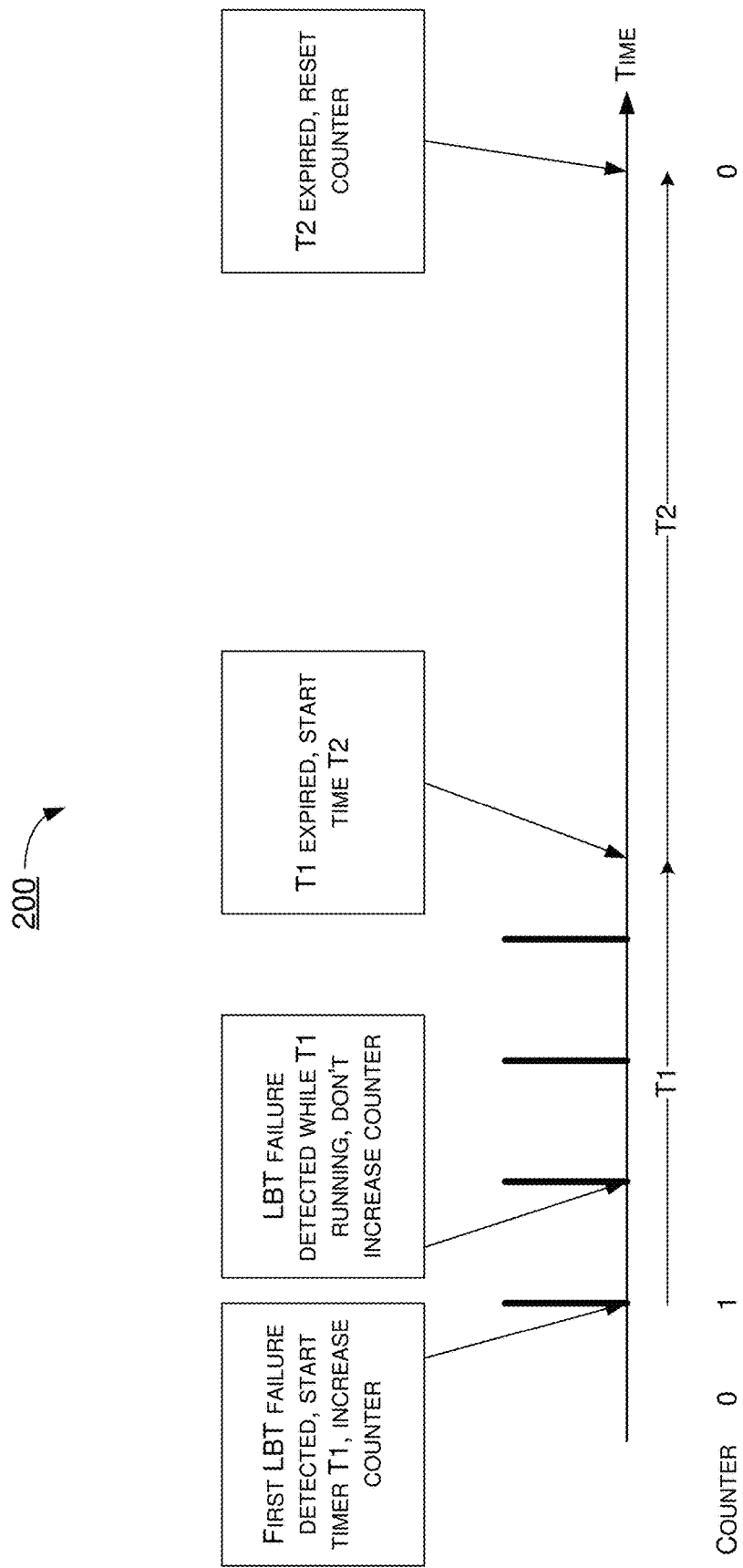
FIG. 2 is a diagram depicting an example scenario under schemes in accordance with implementations of the present disclosure.

In some implementations, the mechanism for detecting consistent LBT failures may be implemented by a two-step timer method. FIG. 2 illustrates an example scenario 200 under schemes in accordance with implementations of the present disclosure. Scenario 200 involves a UE and a network node, which may be a part of a wireless communication network (e.g., an LTE network, an LTE-Advanced network, an LTE-Advanced Pro network, a 5G network, an NR network, an IoT network, an NB-IoT network or an IIoT network). Similarly, the UE may be configured to sense energy of a channel and determine whether an LBT failure is detected. In an event that a first LBT failure is detected, the UE may be configured to start a first timer (e.g., timer T1). The UE may further be configured to increase an LBT counter by 1. The initial value of the LBT counter may be set as 0.

The UE may be configured to keep monitoring the channel. In an event that the LBT failure is detected again while the first timer is running, the UE may be configured to ignore the LBT failure and not to increase the LBT counter. In some scenarios, many LBT failures may occur in quick succession (e.g., within a short time period), a consistent LBT failure event should not be declared/determined in such scenarios. Thus, the UE may cancel the increment of the LBT counter while the first timer is running. When the first timer is expired, the UE may be configured to start a second timer (e.g., timer T2) to restart counting the LBT failures. In an event that the second timer is expired, it means that the LBT failure has not been detected for a period of time. The UE may be configured to reset the LBT counter (e.g., set the LBT counter to 0).

Figure 3:
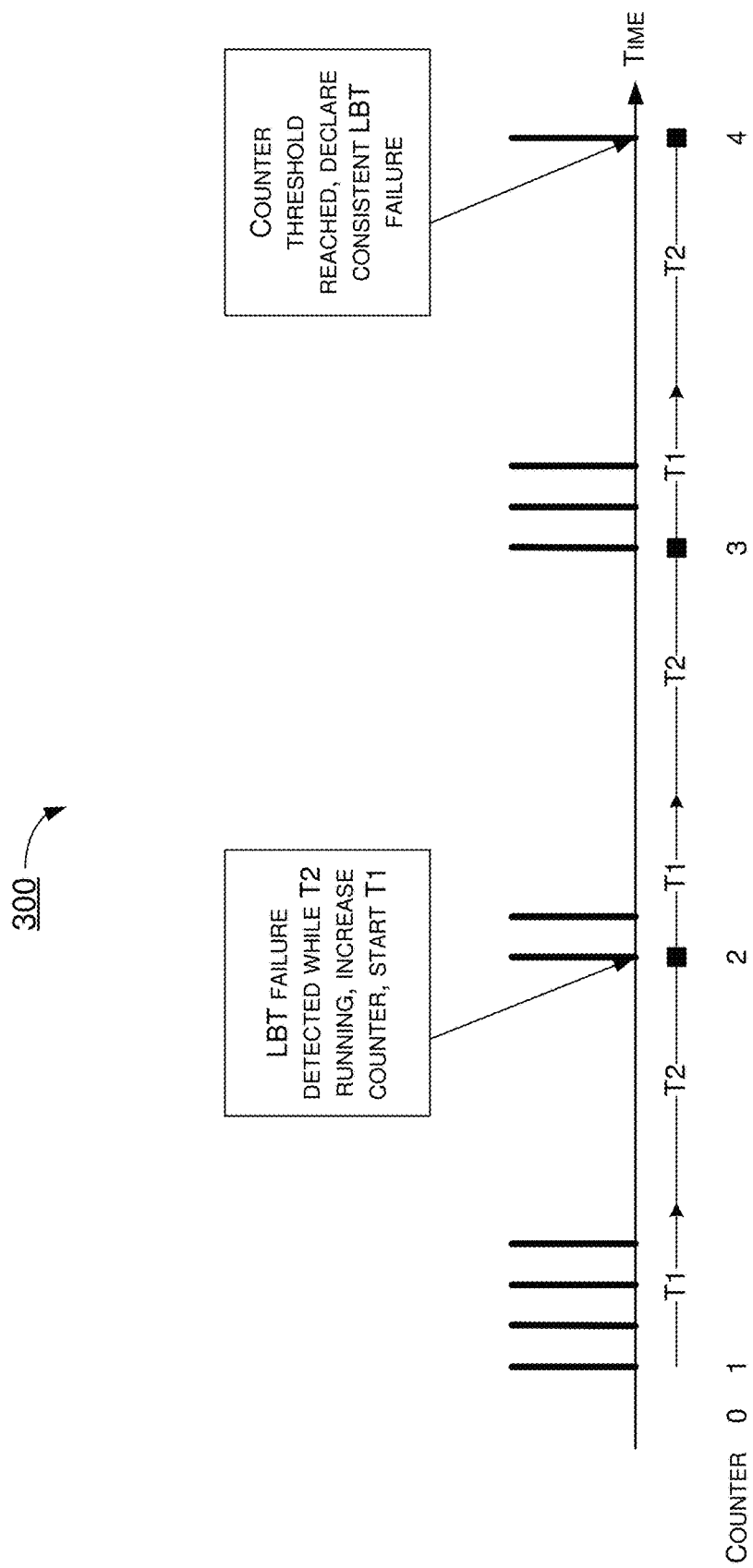
FIG. 3 is a diagram depicting an example scenario under schemes in accordance with implementations of the present disclosure.

FIG. 3 illustrates an example scenario 300 under schemes in accordance with implementations of the present disclosure. In scenario 300, after the second timer (e.g., T2) is started, the LBT failure occurs before the expiration of the second timer. In an event that the LBT failure is detected while the second timer is running, the UE may be configured to increase the LBT counter. When the LBT failure is detected while the second timer is running, the UE may be configured to stop the second timer and start the first timer. Similarly, in an event that the LBT failure is detected again while the first timer is running, the UE may ignore the LBT failure and may not increase the LBT counter. The LBT counter may be increased when the LBT failure is detected while the second timer is running. The UE may further be configured to determine whether the LBT counter reaches a threshold value (e.g., greater than or equal to the threshold value). The threshold value may be a maximum count of LBT failures used for determining a consistent LBT failure. The threshold value may be a predetermined value or configured by the network node (e.g., threshold value=4). In an event that the LBT counter reaches the threshold value, the UE may be configured to declare/determine a consistent LBT failure event. In an event that the LBT counter is below the threshold value, the UE may be configured to start the first timer.

Figure 4:
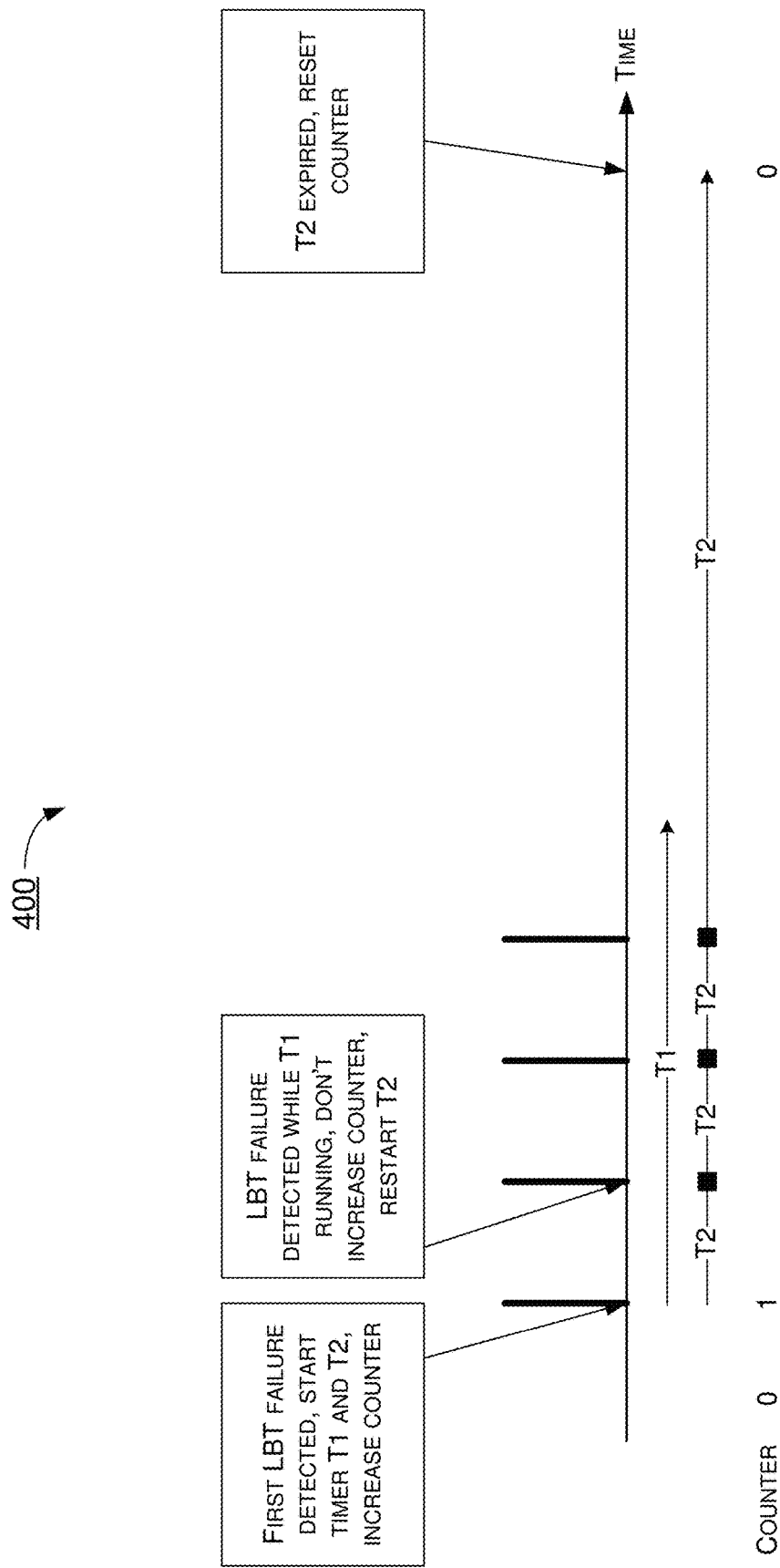
FIG. 4 is a diagram depicting an example scenario under schemes in accordance with implementations of the present disclosure.

In some implementations, the mechanism for detecting consistent LBT failures may be implemented by a two overlapping timers method. FIG. 4 illustrates an example scenario 400 under schemes in accordance with implementations of the present disclosure. Scenario 400 involves a UE and a network node, which may be a part of a wireless communication network (e.g., an LTE network, an LTE-Advanced network, an LTE-Advanced Pro network, a 5G network, an NR network, an IoT network, an NB-IoT network or an IIoT network). Similarly, the UE may be configured to sense energy of a channel and determine whether an LBT failure is detected. In an event that a first LBT failure is detected, the UE may be configured to start a first timer (e.g., timer T1) and a second timer (e.g., timer T2). The UE may further be configured to increase an LBT counter by 1. The initial value of the LBT counter may be set as 0.

The UE may be configured to keep monitoring the channel. In an event that the LBT failure is detected again while the first timer is running, the UE may be configured to ignore the LBT failure and not to increase the LBT counter. The UE may be configured to restart the second timer. In some scenarios, many LBT failures may occur in quick succession (e.g., within a short time period), a consistent LBT failure event should not be declared/determined in such scenarios. Thus, the UE may cancel the increment of the LBT counter while the first timer is running. Whenever the LBT failure is detected again while the first timer is running, the UE may restart the second timer. In an event that the second timer is expired, it means that the LBT failure has not been detected for a period of time. The UE may be configured to reset the LBT counter (e.g., set the LBT counter to 0).

Figure 5:
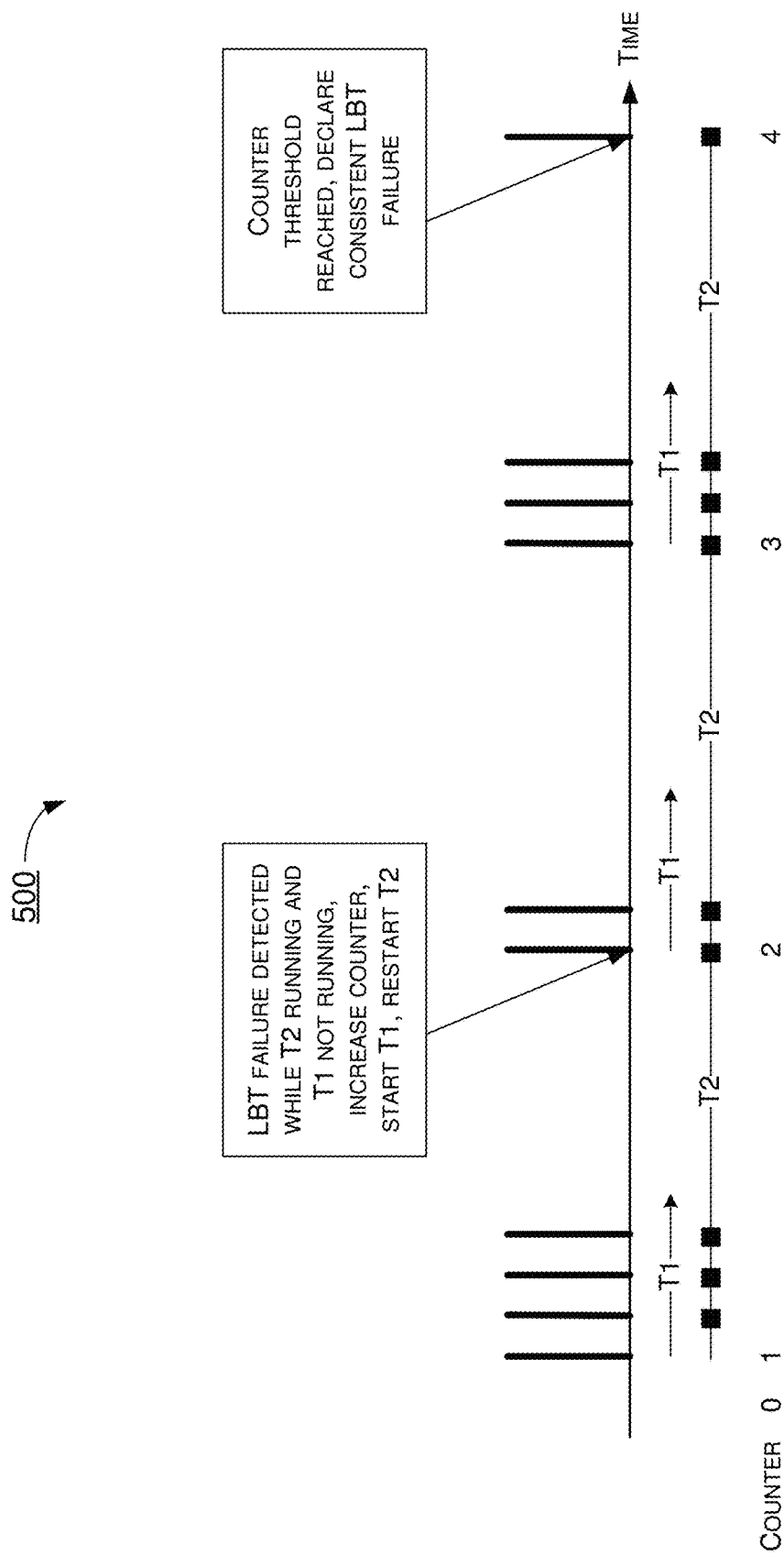
FIG. 5 is a diagram depicting an example scenario under schemes in accordance with implementations of the present disclosure.

FIG. 5 illustrates an example scenario 500 under schemes in accordance with implementations of the present disclosure. In scenario 500, after the first timer (e.g., T1) is expired, the LBT failure occurs before the expiration of the second timer (e.g., T2). In an event that the LBT failure is detected while the second timer is running and the first timer is not running, the UE may be configured to increase the LBT counter. The UE may further start the first timer and restart the second timer. Similarly, in an event that the LBT failure is detected again while the first timer is running, the UE may ignore the LBT failure and restart the second timer. The LBT counter may be increased when the LBT failure is detected while the second timer is running and the first timer is not running. The UE may further be configured to determine whether the LBT counter reaches a threshold value (e.g., greater than or equal to the threshold value). The threshold value may be a maximum count of LBT failures used for determining a consistent LBT failure. The threshold value may be a predetermined value or configured by the network node (e.g., threshold value=4). In an event that the LBT counter reaches the threshold value, the UE may be configured to declare/determine a consistent LBT failure event. In an event that the LBT counter is below the threshold value, the UE may be configured to start the first timer and restart the second timer.

Figure 6:
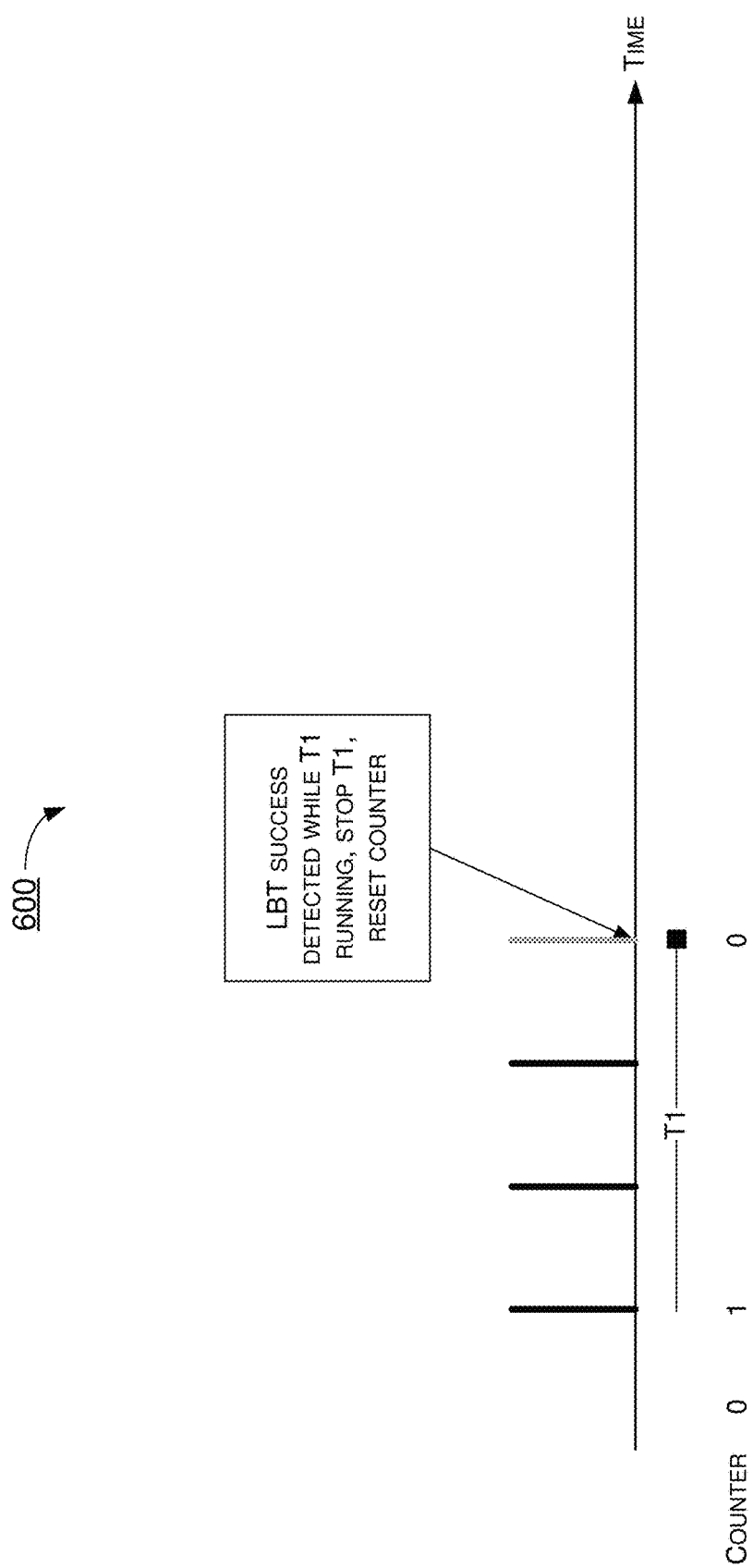
FIG. 6 is a diagram depicting an example scenario under schemes in accordance with implementations of the present disclosure.
Figure 7:
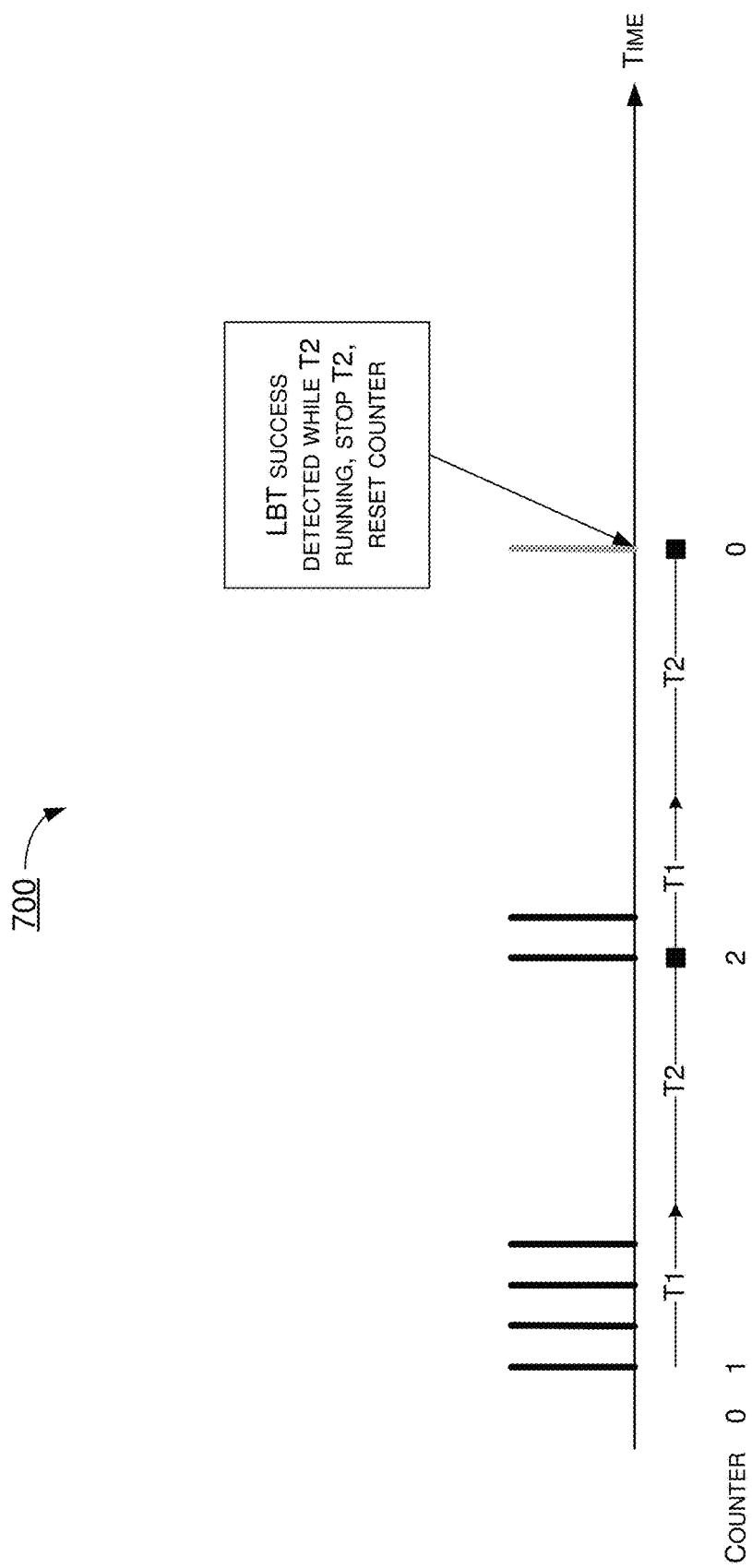
FIG. 7 is a diagram depicting an example scenario under schemes in accordance with implementations of the present disclosure.
Figure 8:
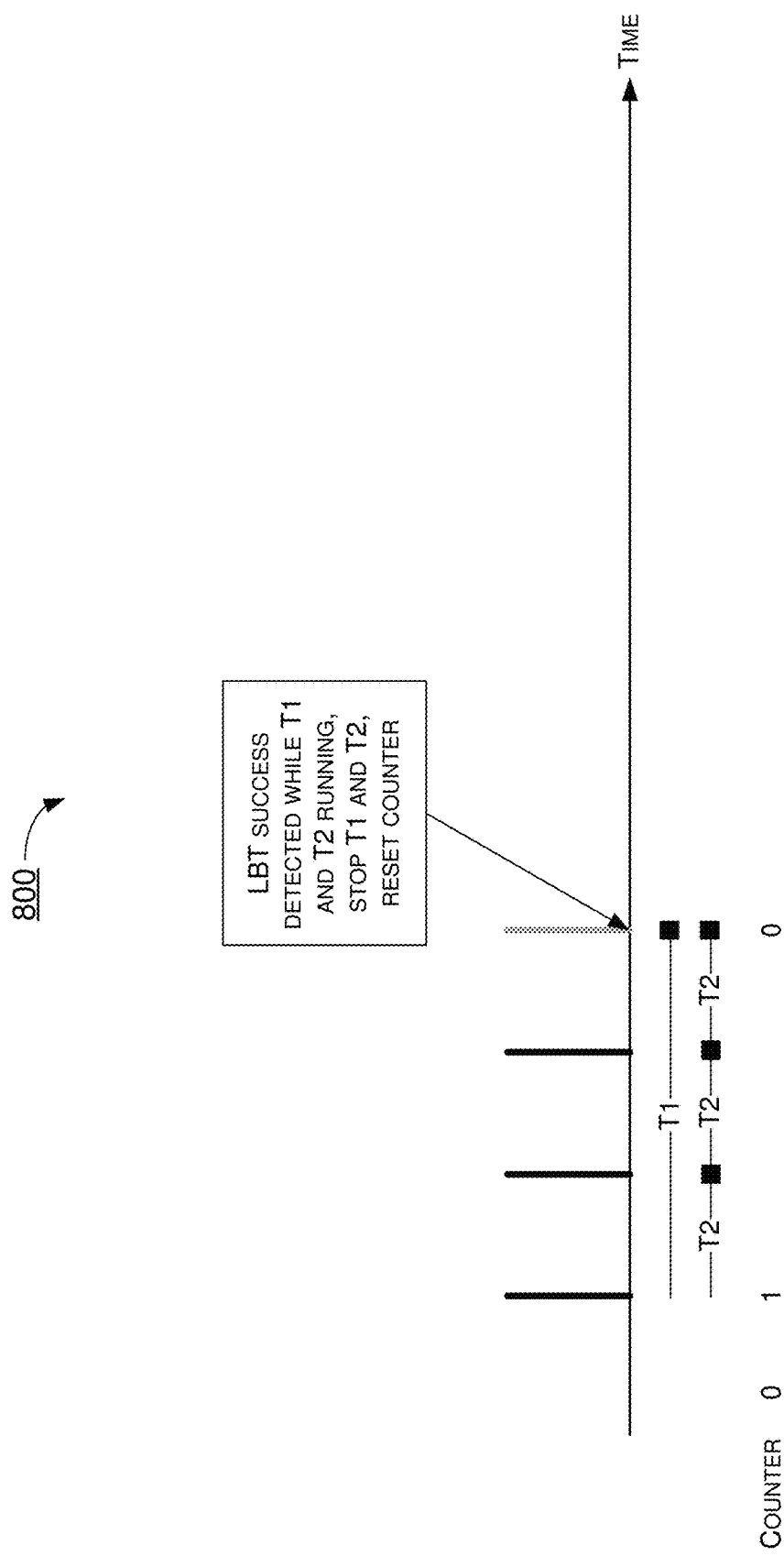
FIG. 8 is a diagram depicting an example scenario under schemes in accordance with implementations of the present disclosure.
Figure 9:
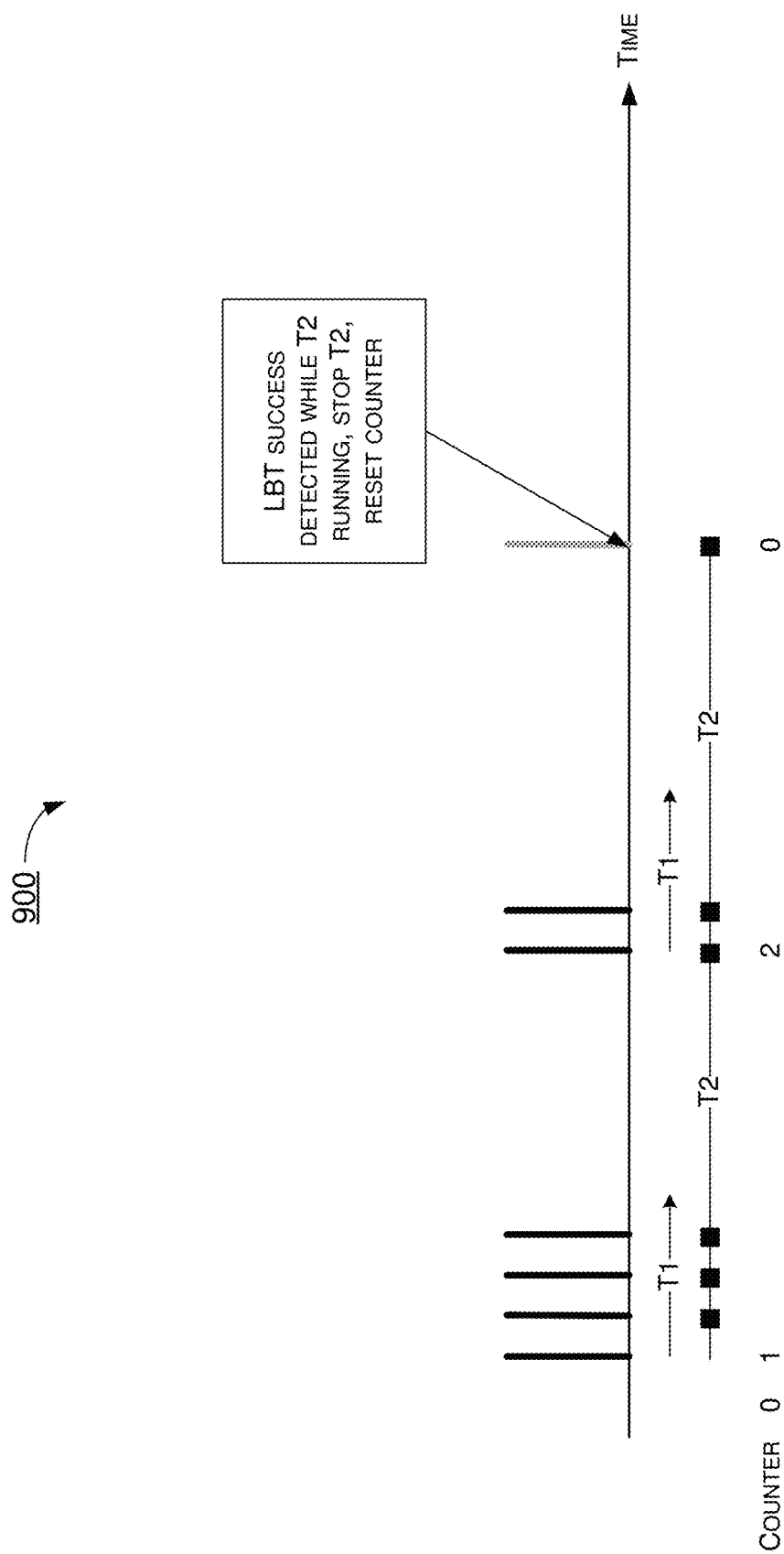
FIG. 9 is a diagram depicting an example scenario under schemes in accordance with implementations of the present disclosure.

In some implementations, an LBT success event may be monitored as well as the LBT failure. The UE may be configured to sense energy of a channel and determine whether an LBT success is detected. In an event that the LBT success is detected, the UE may be configured to stop the timer (e.g., T1 and/or T2). The UE may further reset the LBT counter (e.g., set the LBT counter to 0). FIG. 6 illustrates an example scenario 600 under the two-step timer method in accordance with implementations of the present disclosure. In scenario 600, an LBT success is detected while the first timer (e.g., T1) is running. In an event that the LBT success is detected while the first timer is running, the UE may be configured to stop the first timer and reset the LBT counter. FIG. 7 illustrates an example scenario 700 under the two-step timer method in accordance with implementations of the present disclosure. In scenario 700, an LBT success is detected while the second timer (e.g., T2) is running. In an event that the LBT success is detected while the second timer is running, the UE may be configured to stop the second timer and reset the LBT counter. FIG. 8 illustrates an example scenario 800 under the two overlapping timers method in accordance with implementations of the present disclosure. In scenario 800, an LBT success is detected while the first timer (e.g., T1) and the second timer (e.g., T2) are running. In an event that the LBT success is detected while the first timer and the second timer are running, the UE may be configured to stop both the first timer and the second timer and reset the LBT counter. FIG. 9 illustrates an example scenario 900 under the two overlapping timers method in accordance with implementations of the present disclosure. In scenario 900, an LBT success is detected while the second timer (e.g., T2) is running. In an event that the LBT success is detected while the second timer is running, the UE may be configured to stop the second timer and reset the LBT counter.

In some implementations, the mechanism for detecting consistent LBT failures may be implemented by a timer based method. The UE may determine a consistent LBT failure event according to a timer. Specifically, the UE may be configured to determine whether an uplink transmission is triggered. In an event that the uplink transmission is triggered, the UE may be configured to start a timer. The start of the timer may be triggered by some events. For example, the start of the timer may be triggered when a medium access control (MAC) layer instructs a physical layer to perform a transmission. Alternatively, the start of the timer may be triggered at the time when a transmission is expected to take place at the physical layer (e.g., on a next SR or RACH preamble transmission occasion, or at an uplink data or uplink control transmission occasion as indicated by the network node). The timer may also be started depending on some conditions. For example, in an event that the LBT procedure is required to perform the uplink transmission, the UE may start the timer. Alternatively, in an event that the timer is not running at the time when it is to be started, the UE may start the timer. In addition, the UE may be configured to stop the timer according to some events. For example, when a physical layer indicates to a MAC layer that an LBT procedure has been successful (e.g., the channel has been acquired for a UE transmission), the UE may stop and/or reset the timer. Alternatively, when a physical layer has successfully completed an uplink transmission, the UE may stop and/or reset the timer. Furthermore, the UE may further be configured to determine whether the timer is expired. In an event that the timer is expired, the UE may be configured to declare/determine a consistent LBT failure event.

In some implementations, the mechanism for detecting consistent LBT failures may be implemented by a counter based method. The UE may determine a consistent LBT failure event according to a counter. Specifically, the UE may be configured to determine whether an uplink transmission is triggered. In an event that the uplink transmission is triggered, the UE may be configured to initiate a counter. In an event that the LBT for the transmission fails, the UE may be configured to increase the counter. The energy level of the channel may be sensed again after a predetermined duration following the LBT failure. Each time the LBT fails, the UE may be configured to increase the counter. When the transmission or the LBT is successful, the UE may clear/initialize the counter (e.g., set the counter to 0). In an event that the counter reaches a predetermined maximum value, the UE may be configured to declare/determine a consistent LBT failure event.

Figure 10:
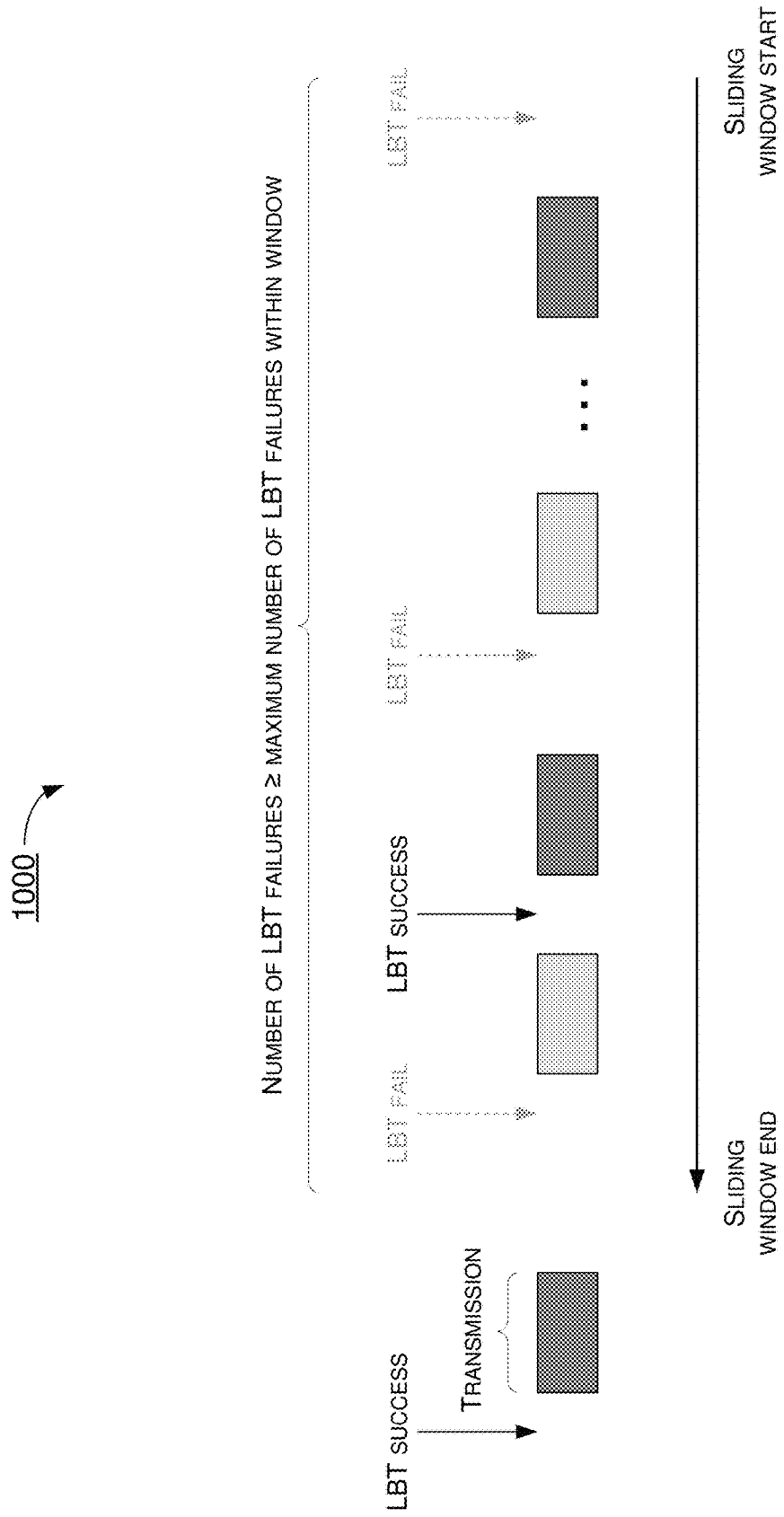
FIG. 10 is a diagram depicting an example scenario under schemes in accordance with implementations of the present disclosure.

In some implementations, the mechanism for detecting consistent LBT failures may be implemented by a sliding window method. The UE may determine a consistent LBT failure event according to a sliding window. FIG. 10 illustrates an example scenario 1000 under schemes in accordance with implementations of the present disclosure. Scenario 1000 involves a UE and a network node, which may be a part of a wireless communication network (e.g., an LTE network, an LTE-Advanced network, an LTE-Advanced Pro network, a 5G network, an NR network, an IoT network, an NB-IoT network or an IIoT network). The UE may be configured to maintain a sliding window of its transmissions. The sliding window may comprise a time window or a count of number of transmissions. The sliding window may cover past transmission which attempts within the window duration. The length of the sliding window may be configured by the network node or determined by the UE. The UE may be configured to initiate an LBT failure counter. In an event that an LBT failure is detected within the sliding window, the UE may be configured to increase the LBT failure counter. The UE may further be configured to determine whether the LBT counter reaches a threshold value (e.g., a maximum number of LBT failures allowed within the window). In an event that the LBT counter reaches the threshold value, the UE may be configured to declare/determine a consistent LBT failure event.

In some implementations, in an event that the consistent LBT failure is declared/determined on a channel, the UE may be configured to perform some actions. The channel may comprise a bandwidth part (BWP) or a sub-band. For example, in an event that the consistent LBT failure event is determined on a BWP, the UE may be configured to initiate a switch to a different BWP in an event that there is another BWP with configured RACH resources. In an event that no other channel (e.g. BWP or sub-band) is available on a cell (e.g., primary cell (PCell)) or the consistent LBT failure event is determined on a predetermined number of BWP of the cell, the UE may be configured to declare/determine a radio link failure (RLF) event. For example, the UE may perform RLF recovery in an event that the consistent LBT failure is detected on the PCell and the LBT failure is detected on "N" possible BWP. "N" may comprise the number of configured BWPs with configured physical RACH (PRACH) resources. Then, the UE may be configured to perform an RLF recovery procedure. The UE may be configured to perform cell selection.

Figure 11:
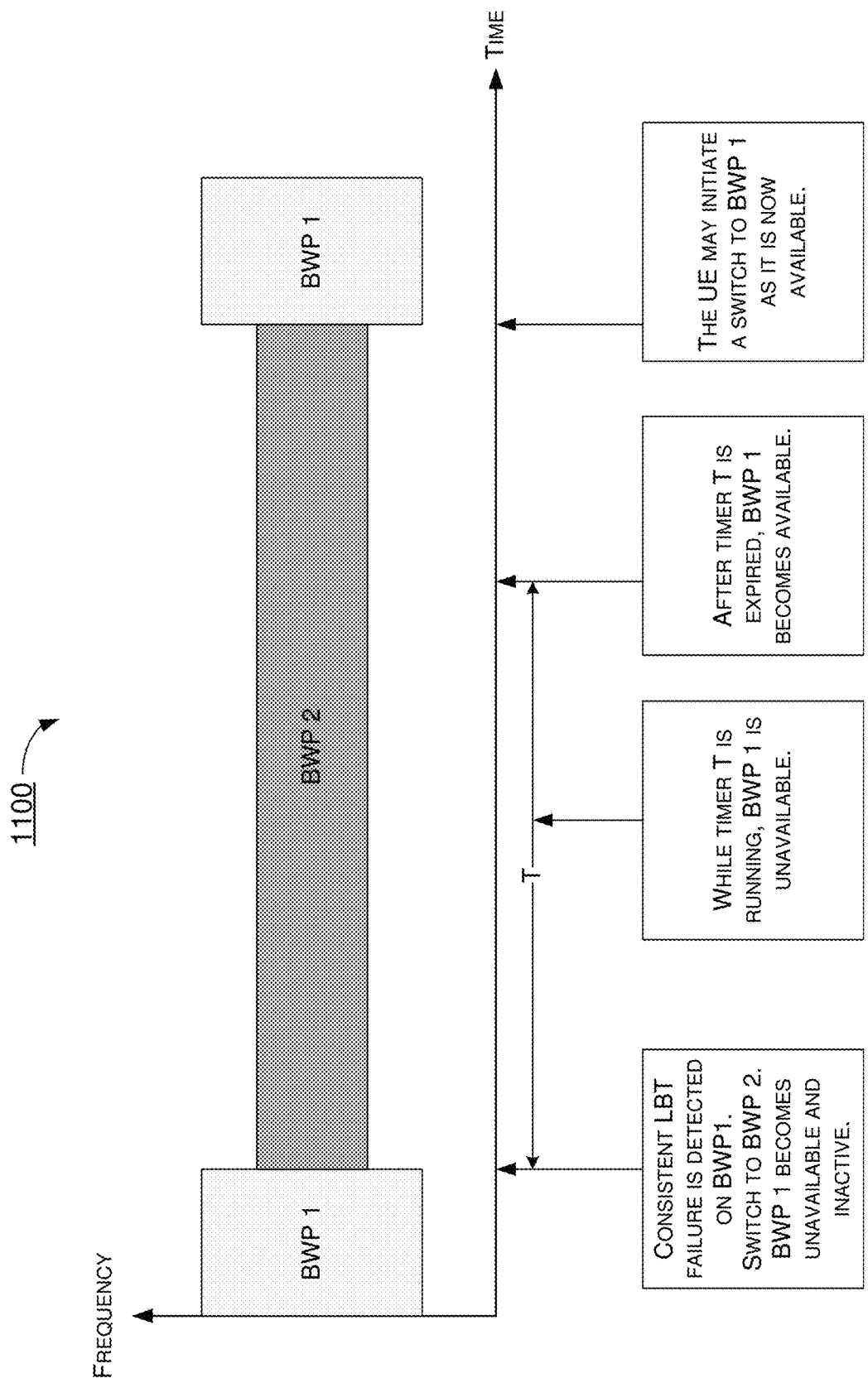
FIG. 11 is a diagram depicting an example scenario under schemes in accordance with implementations of the present disclosure.

FIG. 11 illustrates an example scenario 1100 under schemes in accordance with implementations of the present disclosure. Scenario 1100 involves a UE and a network node, which may be a part of a wireless communication network (e.g., an LTE network, an LTE-Advanced network, an LTE-Advanced Pro network, a 5G network, an NR network, an IoT network, an NB-IoT network or an IIoT network). The UE may be configured with a first BWP (e.g., BWP 1) and a second BWP (e.g., BWP 2). In an event that the consistent LBT failure is detected on the first BWP, the UE may be configured to switch to the second BWP. The UE may set the channel (e.g. BWP or sub-band) where the consistent LBT failure condition is detected as unavailable for a fixed time duration. For example, the first BWP may be set as unavailable for a time duration T (e.g., a timer T). The first BWP may become unavailable and inactive. The time duration may be a predetermined time duration or configured by the network node via radio resource control (RRC) signalling. The time duration may be configured when the BWP is configured. The time duration may be configured per BWP or per cell. The time duration may also be set to infinity.

While the timer T is running, the first BWP is unavailable. While the channel (e.g. BWP or sub-band) is unavailable, the UE may consider the channel unavailable to be switched to by the UE (e.g. for BWP switching by the UE), i.e. UE initiated switching may be prohibited. After the timer T is expired, the channel (e.g. BWP or sub-band) may be set as available. The UE may initiate a switch to the first BWP since it becomes available. In some implementations, in an event that the network initiates a switch to an unavailable channel, (e.g. BWP switching by physical downlink control channel (PDCCH) or RRC signalling), the unavailable channel (e.g. BWP) may be set as available and active. The unavailable BWPs on a cell may become available in an event that the cell is deactivated and activated again.

In some implementations, in an event that the consistent LBT failure event is determined for a transmission, the UE may be configured to perform other actions. The actions may comprise, for example and without limitation, at least one of releasing a physical uplink control channel (PUCCH), releasing a sounding reference signal (SRS), clearing configured downlink assignments and uplink grants, clearing physical uplink shared channel (PUSCH) resources for semi-persistent channel stat information (CSI) reporting, initiating a random access procedure on the same channel, initiating a random access procedure on a different channel, triggering a radio link failure procedure, triggering a BWP switch away from the busy channel, triggering a switch of the channel that is being used actively, performing a handover to a different cell or a different channel, and entering into an idle or inactive mode. In the idle mode, the UE may reselect to a cell or channel that is not experiencing high channel occupancy and resume the connection. The switch of the channel may be indicated to the network node with the use of control signalling such as a RACH or an SR.

Illustrative Implementations

Figure 12:
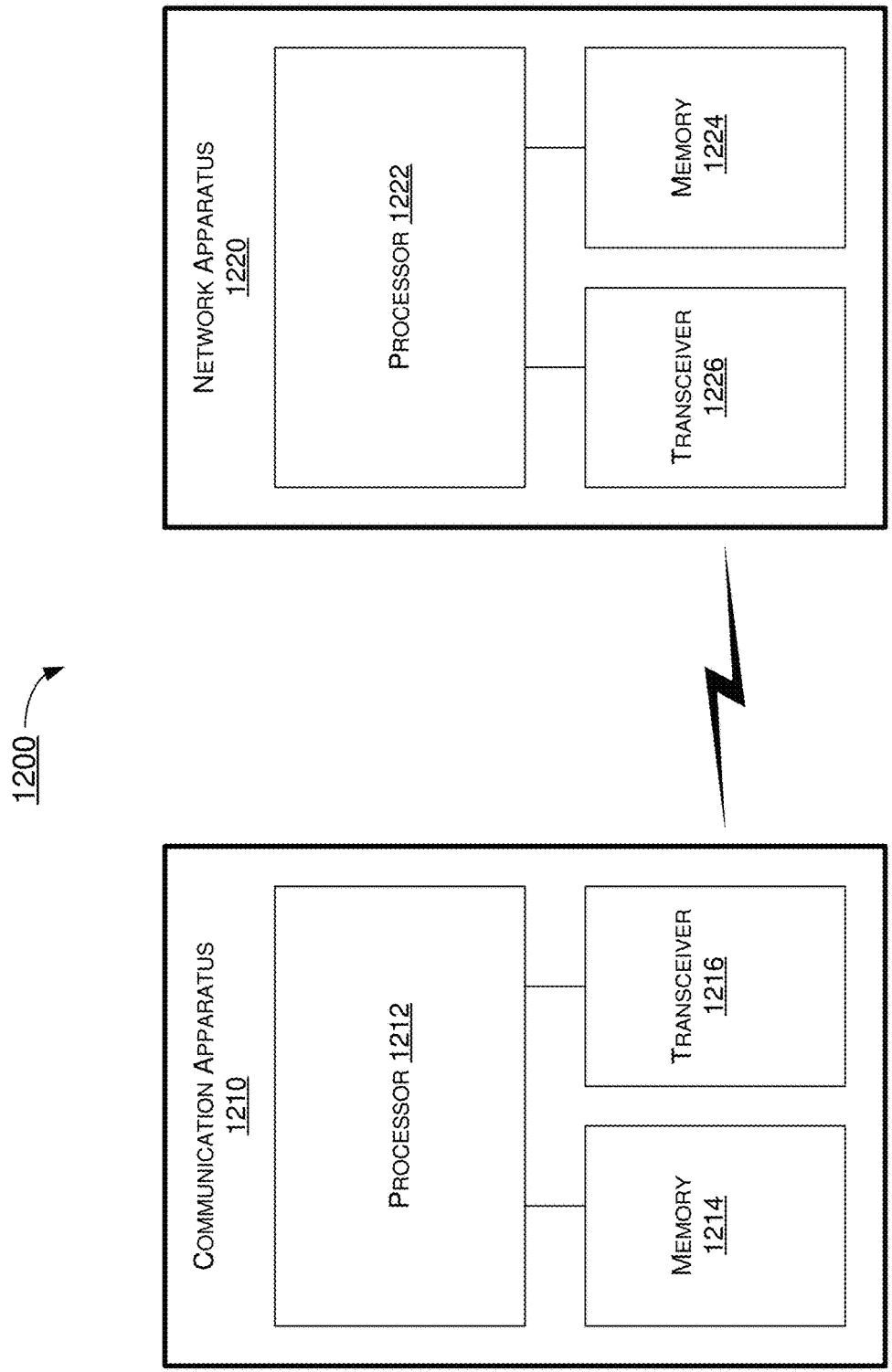
FIG. 12 is a block diagram of an example communication apparatus and an example network apparatus in accordance with an implementation of the present disclosure.

FIG. 12 illustrates an example communication apparatus 1210 and an example network apparatus 1220 in accordance with an implementation of the present disclosure. Each of communication apparatus 1210 and network apparatus 1220 may perform various functions to implement schemes, techniques, processes and methods described herein pertaining to detecting consistent LBT failure with respect to user equipment and network apparatus in wireless communications, including scenarios/methods described above as well as processes 1300, 1400 and 1500 described below.

Communication apparatus 1210 may be a part of an electronic apparatus, which may be a UE such as a portable or mobile apparatus, a wearable apparatus, a wireless communication apparatus or a computing apparatus. For instance, communication apparatus 1210 may be implemented in a smartphone, a smartwatch, a personal digital assistant, a digital camera, or a computing equipment such as a tablet computer, a laptop computer or a notebook computer. Communication apparatus 1210 may also be a part of a machine type apparatus, which may be an IoT, NB-IoT, or IIoT apparatus such as an immobile or a stationary apparatus, a home apparatus, a wire communication apparatus or a computing apparatus. For instance, communication apparatus 1210 may be implemented in a smart thermostat, a smart fridge, a smart door lock, a wireless speaker or a home control center. Alternatively, communication apparatus 1210 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 1210 may include at least some of those components shown in FIG. 12 such as a processor 1212, for example. communication apparatus 1210 may further include one or more other components not pertinent to the proposed scheme of the present disclosure (e.g., internal power supply, display device and/or user interface device), and, thus, such component(s) of communication apparatus 1210 are neither shown in FIG. 12 nor described below in the interest of simplicity and brevity.

Network apparatus 1220 may be a part of an electronic apparatus, which may be a network node such as a base station, a small cell, a router or a gateway. For instance, network apparatus 1220 may be implemented in an eNodeB in an LTE, LTE-Advanced or LTE-Advanced Pro network or in a gNB in a 5G, NR, IoT, NB-IoT or IIoT network. Alternatively, network apparatus 1220 may be implemented in the form of one or more IC chips such as, for example and without limitation, one or more single-core processors, one or more multi-core processors, or one or more RISC or CISC processors. Network apparatus 1220 may include at least some of those components shown in FIG. 12 such as a processor 1222, for example. Network apparatus 1220 may further include one or more other components not pertinent to the proposed scheme of the present disclosure (e.g., internal power supply, display device and/or user interface device), and, thus, such component(s) of network apparatus 1220 are neither shown in FIG. 12 nor described below in the interest of simplicity and brevity.

In one aspect, each of processor 1212 and processor 1222 may be implemented in the form of one or more single-core processors, one or more multi-core processors, or one or more CISC processors. That is, even though a singular term "a processor" is used herein to refer to processor 1212 and processor 1222, each of processor 1212 and processor 1222 may include multiple processors in some implementations and a single processor in other implementations in accordance with the present disclosure. In another aspect, each of processor 1212 and processor 1222 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 1212 and processor 1222 is a special-purpose machine specifically designed, arranged and configured to perform specific tasks including power consumption reduction in a device (e.g., as represented by communication apparatus 1210) and a network (e.g., as represented by network apparatus 1220) in accordance with various implementations of the present disclosure.

In some implementations, communication apparatus 1210 may also include a transceiver 1216 coupled to processor 1212 and capable of wirelessly transmitting and receiving data. In some implementations, communication apparatus 1210 may further include a memory 1214 coupled to processor 1212 and capable of being accessed by processor 1212 and storing data therein. In some implementations, network apparatus 1220 may also include a transceiver 1226 coupled to processor 1222 and capable of wirelessly transmitting and receiving data. In some implementations, network apparatus 1220 may further include a memory 1224 coupled to processor 1222 and capable of being accessed by processor 1222 and storing data therein. Accordingly, communication apparatus 1210 and network apparatus 1220 may wirelessly communicate with each other via transceiver 1216 and transceiver 1226, respectively. To aid better understanding, the following description of the operations, functionalities and capabilities of each of communication apparatus 1210 and network apparatus 1220 is provided in the context of a mobile communication environment in which communication apparatus 1210 is implemented in or as a communication apparatus or a UE and network apparatus 1220 is implemented in or as a network node of a communication network.

In some implementations, processor 1212 may be configured to sense, via transceiver 1216, energy of a channel for a period of time. Processor 1212 may be configured to determine whether an LBT failure is detected. In an event that the LBT failure is detected, processor 1212 may be configured to start a timer (e.g., an LBT failure detection timer). Processor 1212 may further be configured to increase an LBT counter. Processor 1212 may be configured to keep monitoring the channel. In an event that the timer is expired, processor 1212 may be configured to reset the LBT counter (e.g., set the LBT counter to 0). In an event that an LBT failure is detected while the timer is running, processor 1212 may be configured to restart the timer and increase the LBT counter. In addition, processor 1212 may be configured to determine whether the LBT counter reaches a threshold value (e.g., greater than or equal to the threshold value). In an event that the LBT counter reaches the threshold value, processor 1212 may be configured to declare/determine a consistent LBT failure event.

In some implementations, processor 1212 may detect consistent LBT failures according to a two-step timer method. Processor 1212 may be configured to sense, via transceiver 1216, energy of a channel and determine whether an LBT failure is detected. In an event that a first LBT failure is detected, processor 1212 may be configured to start a first timer. Processor 1212 may further be configured to increase an LBT counter. Processor 1212 may be configured to keep monitoring the channel. In an event that the LBT failure is detected again while the first timer is running, processor 1212 may be configured to ignore the LBT failure and not to increase the LBT counter. In some implementations, processor 1212 may cancel the increment of the LBT counter while the first timer is running. When the first timer is expired, processor 1212 may be configured to start a second timer to restart counting the LBT failures. In an event that the second timer is expired, processor 1212 may be configured to reset the LBT counter (e.g., set the LBT counter to 0).

In some implementations, after the second timer is started, the LBT failure may occur before the expiration of the second timer. In an event that the LBT failure is detected while the second timer is running, processor 1212 may be configured to increase the LBT counter. When the LBT failure is detected while the second timer is running, processor 1212 may be configured to stop the second timer and start the first timer. Similarly, in an event that the LBT failure is detected again while the first timer is running, processor 1212 may ignore the LBT failure and may not increase the LBT counter. Processor 1212 may further be configured to determine whether the LBT counter reaches a threshold value (e.g., greater than or equal to the threshold value). In an event that the LBT counter reaches the threshold value, processor 1212 may be configured to declare/determine a consistent LBT failure event. In an event that the LBT counter is below the threshold value, processor 1212 may be configured to start the first timer.

In some implementations, processor 1212 may detect consistent LBT failures according to a two overlapping timers method. Processor 1212 may be configured to sense, via transceiver 1216, energy of a channel and determine whether an LBT failure is detected. In an event that a first LBT failure is detected, processor 1212 may be configured to start a first timer and a second timer. Processor 1212 may further be configured to increase an LBT counter. Processor 1212 may be configured to keep monitoring the channel. In an event that the LBT failure is detected again while the first timer is running, processor 1212 may be configured to ignore the LBT failure and not to increase the LBT counter. Processor 1212 may be configured to restart the second timer. Processor 1212 may cancel the increment of the LBT counter while the first timer is running. Whenever the LBT failure is detected again while the first timer is running, processor 1212 may restart the second timer. In an event that the second timer is expired, processor 1212 may be configured to reset the LBT counter (e.g., set the LBT counter to 0).

In some implementations, after the first timer is expired, the LBT failure may occur before the expiration of the second timer. In an event that the LBT failure is detected while the second timer is running and the first timer is not running, processor 1212 may be configured to increase the LBT counter. Processor 1212 may further start the first timer and restart the second timer. Similarly, in an event that the LBT failure is detected again while the first timer is running, processor 1212 may ignore the LBT failure and restart the second timer. Processor 1212 may further be configured to determine whether the LBT counter reaches a threshold value (e.g., greater than or equal to the threshold value). In an event that the LBT counter reaches the threshold value, processor 1212 may be configured to declare/determine a consistent LBT failure event. In an event that the LBT counter is below the threshold value, processor 1212 may be configured to start the first timer and restart the second timer.

In some implementations, processor 1212 may be configured to sense, via transceiver 1216, energy of a channel and determine whether an LBT success is detected. In an event that the LBT success is detected, processor 1212 may be configured to stop the timer (e.g., the first timer and/or the second timer. Processor 1212 may further reset the LBT counter (e.g., set the LBT counter to 0).

In some implementations, processor 1212 may determine a consistent LBT failure event according to a timer. Specifically, processor 1212 may be configured to determine whether an uplink transmission is triggered. In an event that the uplink transmission is triggered, processor 1212 may be configured to start a timer. Processor 1212 may start the timer when a MAC layer instructs a physical layer to perform a transmission. Alternatively, processor 1212 may start the timer at the time when a transmission is expected to take place at the physical layer (e.g., on a next SR or RACH preamble transmission occasion, or at an uplink data or uplink control transmission occasion as indicated by network apparatus 1220). Processor 1212 may start the timer accordingly to some conditions. For example, in an event that the LBT procedure is required to perform the uplink transmission, processor 1212 may start the timer. Alternatively, in an event that the timer is not running at the time when it is to be started, processor 1212 may start the timer. In addition, processor 1212 may be configured to stop the timer according to some events. For example, when a physical layer indicates to a MAC layer that an LBT procedure has been successful (e.g., the channel has been acquired for a transmission), processor 1212 may stop and/or reset the timer. Alternatively, when a physical layer has successfully completed an uplink transmission, processor 1212 may stop and/or reset the timer. Furthermore, processor 1212 may further be configured to determine whether the timer is expired. In an event that the timer is expired, processor 1212 may be configured to declare/determine a consistent LBT failure event.

In some implementations, processor 1212 may determine a consistent LBT failure event according to a counter. Specifically, processor 1212 may be configured to determine whether an uplink transmission is triggered. In an event that the uplink transmission is triggered, processor 1212 may be configured to initiate a counter. In an event that the LBT for the transmission fails, processor 1212 may be configured to increase the counter. Processor 1212 may sense, via transceiver 1216, the energy level of the channel again after a predetermined duration following the LBT failure. Each time the LBT fails, processor 1212 may be configured to increase the counter. When the transmission or the LBT is successful, processor 1212 may clear/initialize the counter (e.g., set the counter to 0). In an event that the counter reaches a predetermined maximum value, processor 1212 may be configured to declare/determine a consistent LBT failure event.

In some implementations, processor 1212 may determine a consistent LBT failure event according to a sliding window. Processor 1212 may be configured to maintain a sliding window of its transmissions. The length of the sliding window may be configured by network apparatus 1220 or determined by processor 1212. Processor 1212 may be configured to initiate an LBT failure counter. In an event that an LBT failure is detected within the sliding window, processor 1212 may be configured to increase the LBT failure counter. Processor 1212 may further be configured to determine whether the LBT counter reaches a threshold value (e.g., a maximum number of LBT failures allowed within the window). In an event that the LBT counter reaches the threshold value, processor 1212 may be configured to declare/determine a consistent LBT failure event.

In some implementations, in an event that the consistent LBT failure is declared/determined on a channel, processor 1212 may be configured to perform some actions. For example, in an event that the consistent LBT failure event is determined on a BWP, processor 1212 may be configured to initiate a switch to a different BWP. In an event that no other channel (e.g. BWP or sub-band) is available on a cell or the consistent LBT failure event is determined on a predetermined number of BWP of the cell, processor 1212 may be configured to declare/determine an RLF event. For example, processor 1212 may perform RLF recovery in an event that the consistent LBT failure is detected on the PCell and the LBT failure is detected on "N" possible BWP. Then, processor 1212 may be configured to perform an RLF recovery procedure. Processor 1212 may be configured to perform cell selection.

In some implementations, in an event that the consistent LBT failure event is determined for a transmission, processor 1212 may be configured to perform other actions. For example, processor 1212 may be configured to release a PUCCH, release an SRS, clear configured downlink assignments and uplink grants, clear PUSCH resources for semi-persistent CSI reporting, initiate a random access procedure on the same channel, initiate a random access procedure on a different channel, trigger a radio link failure procedure, trigger a BWP switch away from the busy channel, trigger a switch of the channel that is being used actively, perform a handover to to a different cell or a different channel, or enter into an idle or inactive mode. In the idle mode, processor 1212 may reselect to a cell or channel that is not experiencing high channel occupancy and resume the connection. Processor 1212 may indicate the switch of the channel to network apparatus 1220 with the use of control signalling such as a RACH or an SR.

Illustrative Processes

Figure 13:
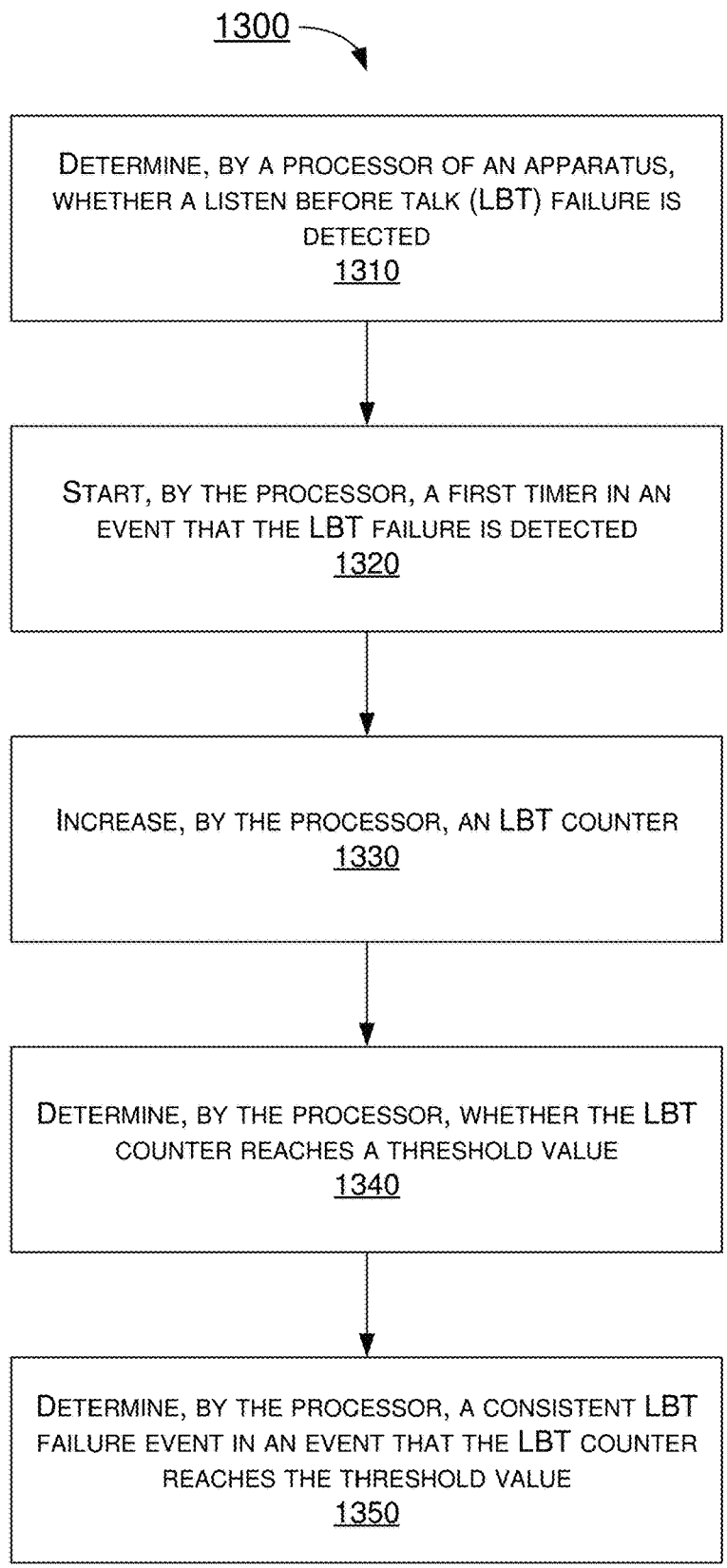
FIG. 13 is a flowchart of an example process in accordance with an implementation of the present disclosure.

FIG. 13 illustrates an example process 1300 in accordance with an implementation of the present disclosure. Process 1300 may be an example implementation of above scenarios/schemes, whether partially or completely, with respect to detecting consistent LBT failure with the present disclosure. Process 1300 may represent an aspect of implementation of features of communication apparatus 1210. Process 1300 may include one or more operations, actions, or functions as illustrated by one or more of blocks 1310, 1320, 1330, 1340 and 1350. Although illustrated as discrete blocks, various blocks of process 1300 may be divided into additional blocks, combined into fewer blocks, or eliminated, depending on the desired implementation. Moreover, the blocks of process 1300 may executed in the order shown in FIG. 13 or, alternatively, in a different order. Process 1300 may be implemented by communication apparatus 1210 or any suitable UE or machine type devices. Solely for illustrative purposes and without limitation, process 1300 is described below in the context of communication apparatus 1210. Process 1300 may begin at block 1310.

At 1310, process 1300 may involve processor 1212 of apparatus 1210 determining whether an LBT failure is detected. Process 1300 may proceed from 1310 to 1320.

At 1320, process 1300 may involve processor 1212 starting a first timer in an event that the LBT failure is detected. Process 1300 may proceed from 1320 to 1330.

At 1330, process 1300 may involve processor 1212 increasing an LBT counter. Process 1300 may proceed from 1330 to 1340.

At 1340, process 1300 may involve processor 1212 determining whether the LBT counter reaches a threshold value. Process 1300 may proceed from 1340 to 1350.

At 1350, process 1300 may involve processor 1212 determining a consistent LBT failure event in an event that the LBT counter reaches the threshold value.

In some implementations, process 1300 may involve processor 1212 resetting the LBT counter when the first timer is expired.

In some implementations, process 1300 may involve processor 1212 restarting the first timer in an event that the LBT failure is detected while the first timer is running.

In some implementations, process 1300 may involve processor 1212 ignoring the LBT failure in an event that the LBT failure is detected while the first timer is running.

In some implementations, process 1300 may involve processor 1212 starting a second timer when the first timer is expired. Process 1300 may also involve processor 1212 increasing the LBT counter in an event that the LBT failure is detected while the second timer is running. Process 1300 may further involve processor 1212 starting the first timer. Process 1300 may further involve processor 1212 resetting the LBT counter when the second timer is expired.

In some implementations, process 1300 may involve processor 1212 starting a second timer in an event that the LBT failure is detected. Process 1300 may also involve processor 1212 ignoring the LBT failure in an event that the LBT failure is detected while the first timer is running. Process 1300 may further involve processor 1212 restarting, by the processor, the second timer.

In some implementations, process 1300 may involve processor 1212 increasing the LBT counter in an event that the LBT failure is detected while the second timer is running and the first timer is not running. Process 1300 may also involve processor 1212 starting the first timer. Process 1300 may further involve processor 1212 resetting the LBT counter when the second timer is expired.

In some implementations, process 1300 may involve processor 1212 determining whether an LBT success is detected. Process 1300 may also involve processor 1212 stopping the first timer in an event that the LBT success is detected. Process 1300 may further involve processor 1212 resetting the LBT counter.

In some implementations, process 1300 may involve processor 1212 initiating a switch to a different BWP in an event that the consistent LBT failure event is determined.

In some implementations, process 1300 may involve processor 1212 determining an RLF event in an event that the consistent LBT failure event is determined on a predetermined number of BWP. Process 1300 may further involve processor 1212 performing an RLF recovery procedure.

In some implementations, process 1300 may involve processor 1212 setting a BWP where the consistent LBT failure is detected as unavailable for a time duration.

In some implementations, process 1300 may involve processor 1212 performing an action in an event that the consistent LBT failure event is determined. The action may comprise at least one of releasing a PUCCH, releasing an SRS, clearing configured downlink assignments and uplink grants, clearing PUSCH resources, initiating a random access procedure, triggering a radio link failure procedure, triggering a switch of a channel, performing a handover to another cell, and entering into an idle or inactive mode.

In some implementations, process 1300 may involve processor 1212 performing an LBT detection before transmitting an uplink signal. The uplink signal may comprise at least one of a RACH preamble, an SR, a BSR, an SRS, an uplink data, and uplink control information such as CSI or HARQ feedback.

Figure 14:
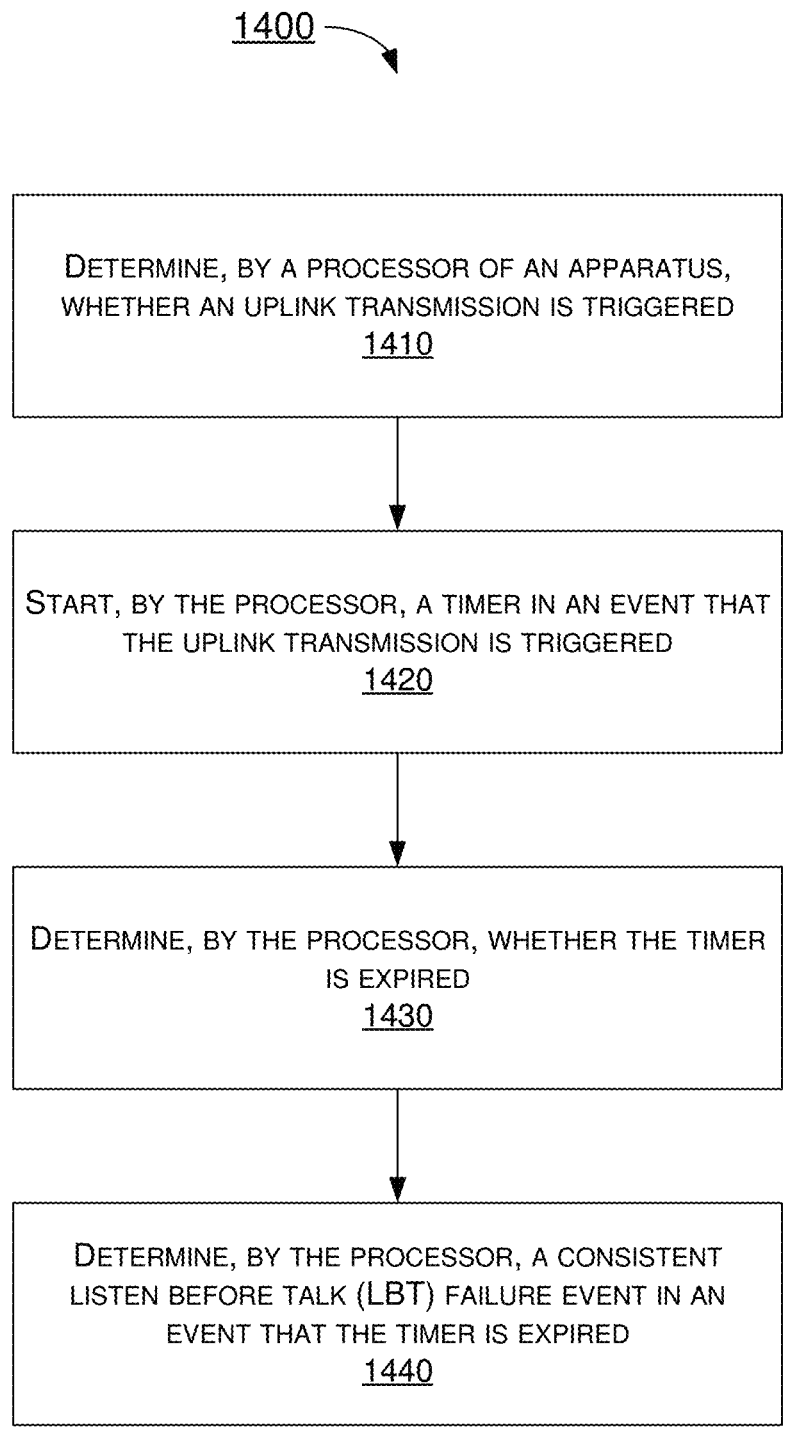
FIG. 14 is a flowchart of an example process in accordance with an implementation of the present disclosure.

FIG. 14 illustrates an example process 1400 in accordance with an implementation of the present disclosure. Process 1400 may be an example implementation of above scenarios/schemes, whether partially or completely, with respect to detecting consistent LBT failure with the present disclosure. Process 1400 may represent an aspect of implementation of features of communication apparatus 1210. Process 1400 may include one or more operations, actions, or functions as illustrated by one or more of blocks 1410, 1420, 1430 and 1440. Although illustrated as discrete blocks, various blocks of process 1400 may be divided into additional blocks, combined into fewer blocks, or eliminated, depending on the desired implementation. Moreover, the blocks of process 1400 may executed in the order shown in FIG. 14 or, alternatively, in a different order. Process 1400 may be implemented by communication apparatus 1210 or any suitable UE or machine type devices. Solely for illustrative purposes and without limitation, process 1500 is described below in the context of communication apparatus 1210. Process 1400 may begin at block 1410.

At 1410, process 1400 may involve processor 1212 of apparatus 1210 determining whether an uplink transmission is triggered. Process 1400 may proceed from 1410 to 1420.

At 1420, process 1400 may involve processor 1212 starting a timer in an event that the uplink transmission is triggered. Process 1400 may proceed from 1420 to 1430.

At 1430, process 1400 may involve processor 1212 determining whether the timer is expired. Process 1400 may proceed from 1430 to 1440.

At 1440, process 1400 may involve processor 1212 determining a consistent LBT failure event in an event that the timer is expired.

In some implementations, process 1400 may involve processor 1212 starting the timer in an event that an LBT procedure is required to perform the uplink transmission.

In some implementations, process 1400 may involve processor 1212 stopping the timer in an event that the LBT procedure is successful or the uplink transmission is completed.

Figure 15:
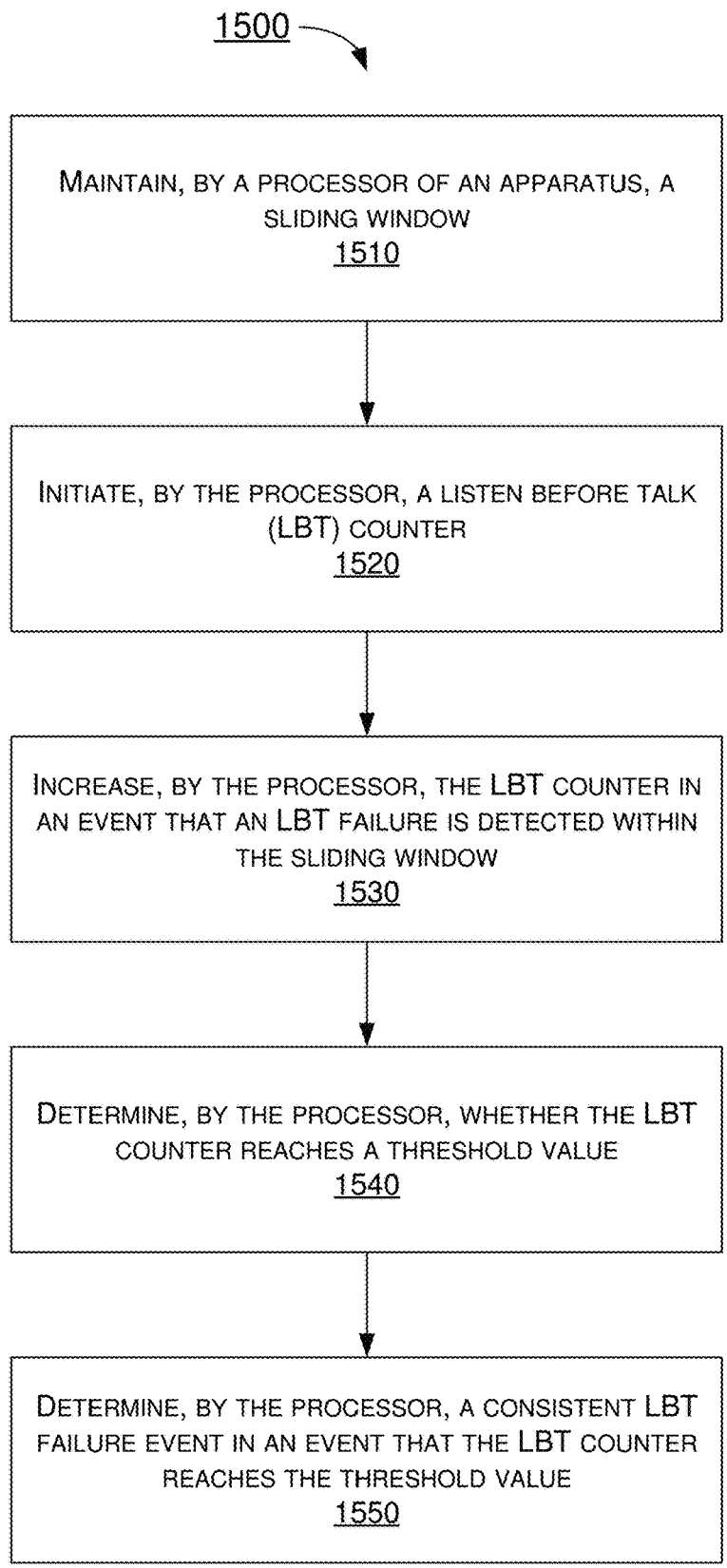
FIG. 15 is a flowchart of an example process in accordance with an implementation of the present disclosure.

FIG. 15 illustrates an example process 1500 in accordance with an implementation of the present disclosure. Process 1500 may be an example implementation of above scenarios/schemes, whether partially or completely, with respect to detecting consistent LBT failure with the present disclosure. Process 1500 may represent an aspect of implementation of features of communication apparatus 1210. Process 1500 may include one or more operations, actions, or functions as illustrated by one or more of blocks 1510, 1520, 1530, 1540 and 1550. Although illustrated as discrete blocks, various blocks of process 1500 may be divided into additional blocks, combined into fewer blocks, or eliminated, depending on the desired implementation. Moreover, the blocks of process 1500 may executed in the order shown in FIG. 15 or, alternatively, in a different order. Process 1500 may be implemented by communication apparatus 1210 or any suitable UE or machine type devices. Solely for illustrative purposes and without limitation, process 1500 is described below in the context of communication apparatus 1210. Process 1500 may begin at block 1510.

At 1510, process 1500 may involve processor 1212 of apparatus 1210 maintaining a sliding window. Process 1500 may proceed from 1510 to 1520.

At 1520, process 1500 may involve processor 1212 initiating an LBT counter. Process 1500 may proceed from 1520 to 1530.

At 1530, process 1500 may involve processor 1212 increasing the LBT counter in an event that an LBT failure is detected within the sliding window. Process 1500 may proceed from 1530 to 1540.

At 1540, process 1500 may involve processor 1212 determining whether the LBT counter reaches a threshold value. Process 1500 may proceed from 1540 to 1550.

At 1550, process 1500 may involve processor 1212 determining a consistent LBT failure event in an event that the LBT counter reaches the threshold value.

In some implementations, the sliding window may comprise a time window or a count of number of transmissions.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   determining, by a processor of an apparatus, whether a listen before talk (LBT) failure is detected;
   starting, by the processor, a first timer in an event that the LBT failure is detected while the first timer is not running;
   restarting, by the processor, the first timer in an event that the LBT failure is detected while the first timer is running;
   increasing, by the processor, an LBT counter in an event that the LBT failure is detected;
   resetting, by the processor, the LBT counter when the first timer is expired;
   determining, by the processor, whether the LBT counter reaches a threshold value; and
   determining, by the processor, a consistent LBT failure event in an event that the LBT counter reaches the threshold value.

2. The method of claim 1, further comprising:
starting, by the processor, a second timer in an event that the LBT failure is detected while the second timer is not running;
ignoring, by the processor, the LBT failure in an event that the LBT failure is detected while the second timer is running;
increasing, by the processor, the LBT counter in an event that the LBT failure is detected while the first timer is running and the second timer is not running.

3. The method of claim 1, further comprising:
determining, by the processor, whether an LBT success is detected;
stopping, by the processor, the first timer in an event that the LBT success is detected; and
resetting, by the processor, the LBT counter.

4. The method of claim 1, further comprising:
initiating, by the processor, a switch to a different bandwidth part (BWP) in an event that the consistent LBT failure event is determined.

5. The method of claim 1, further comprising:
determining, by the processor, a radio link failure (RLF) event in an event that the consistent LBT failure event is determined on a predetermined number of bandwidth part (BWP); and
performing, by the processor, an RLF recovery procedure.

6. The method of claim 1, further comprising:
setting, by the processor, a bandwidth part (BWP) where the consistent LBT failure is detected as unavailable for a time duration.

7. The method of claim 1, further comprising:
performing, by the processor, an action in an event that the consistent LBT failure event is determined,
wherein the action comprises at least one of releasing a physical uplink control channel (PUCCH), releasing a sounding reference signal (SRS), clearing configured downlink assignments and uplink grants, clearing physical uplink shared channel (PUSCH) resources, initiating a random access procedure, triggering a radio link failure procedure, triggering a switch of a channel, performing a handover to another cell, and entering into an idle or inactive mode.

8. The method of claim 1, further comprising:
performing, by the processor, an LBT detection before transmitting an uplink signal,
wherein the uplink signal comprises at least one of a random access channel (RACH) preamble, a scheduling request (SR), a buffer status report (BSR), a sounding reference signal (SRS), an uplink data, and uplink control information.

9. A method, comprising:
determining, by a processor of an apparatus, whether a listen before talk (LBT) failure is detected;
increasing, by the processor, an LBT counter in an event that the LBT failure is detected and a first timer is not running;
starting, by the processor, the first timer in an event that the LBT failure is detected while the first timer is not running;
starting, by the processor, a second timer when the first timer is expired;
resetting, by the processor, the LBT counter when the second timer is expired;
determining, by the processor, whether the LBT counter reaches a threshold value; and
determining, by the processor, a consistent LBT failure event in an event that the LBT counter reaches the threshold value.

10. The method of claim 9, further comprising:
initiating, by the processor, a switch to a different bandwidth part (BWP) in an event that the consistent LBT failure event is determined.

11. The method of claim 9, further comprising:
determining, by the processor, a radio link failure (RLF) event in an event that the consistent LBT failure event is determined on a predetermined number of bandwidth part (BWP); and
performing, by the processor, an RLF recovery procedure.

12. The method of claim 9, further comprising:
setting, by the processor, a bandwidth part (BWP) where the consistent LBT failure is detected as unavailable for a time duration.

13. The method of claim 9, further comprising:
performing, by the processor, an action in an event that the consistent LBT failure event is determined,
wherein the action comprises at least one of releasing a physical uplink control channel (PUCCH), releasing a sounding reference signal (SRS), clearing configured downlink assignments and uplink grants, clearing physical uplink shared channel (PUSCH) resources, initiating a random access procedure, triggering a radio link failure procedure, triggering a switch of a channel, performing a handover to another cell, and entering into an idle or inactive mode.

14. The method of claim 9, further comprising:
performing, by the processor, an LBT detection before transmitting an uplink signal,
wherein the uplink signal comprises at least one of a random access channel (RACH) preamble, a scheduling request (SR), a buffer status report (BSR), a sounding reference signal (SRS), an uplink data, and uplink control information.

\* \* \* \* \*